United States Patent [19]
Emmond

[11] Patent Number: 5,327,557
[45] Date of Patent: Jul. 5, 1994

[54] SINGLE-KEYED INDEXED FILE FOR TP QUEUE REPOSITORY

[75] Inventor: James P. Emmond, Amherst, N.H.

[73] Assignee: Digital Equipment Corporation, Maynard, Mass.

[21] Appl. No.: 573,393

[22] Filed: Aug. 24, 1990

Related U.S. Application Data

[63] Continuation of Ser. No. 220,461, Jul. 18, 1988, abandoned.

[51] Int. Cl.$^5$ ............................ G06F 7/00; G06F 9/46
[52] U.S. Cl. ...................................... 395/650; 395/600; 395/800; 364/DIG. 1; 364/231.4; 364/231.6; 364/244; 364/244.3; 364/252.3; 364/252.4
[58] Field of Search ................ 364/200, 900; 395/600, 395/650, 800

[56] References Cited

PUBLICATIONS

Gio Wiederhold, "Database Design," 2nd Ed., McGraw-Hill, Inc., 1983, pp. 86–98.

*Primary Examiner*—Paul V. Kulik
*Attorney, Agent, or Firm*—Arnold, White & Durkee

[57] ABSTRACT

A task queue is structured as a single-keyed indexed file in which the key has a most significant portion indicating a priority level and a less significant portion that is ordered with the loading of the tasks into the queue. For any given task record in the queue, the less significant portion of the key is determinable from a respective task identifier. Preferably the less significant portion of the key is a "time stamp" including the current date when the task was created and a representation of the data processor's internal 24 hour time clock, and a task identification number is formed by appending a node number to the time stamp in the event that the system has multiple processors capable of creating different tasks at the same time. This format of the single key causes an internal ordering of the records in the queue that is sequential with respect to the less significant portion of the key within blocks of records having the same priority. Therefore, due to the relationship between the key and the task identification number for each task record in the queue, it is possible to quickly search for the record having a requested task identification number. Conventional memory management facilities for accessing key-indexed files can be used for searching the queue. In this case the queue is searched by random or "key next" access to repeatedly step through the possible priority levels until a record having a matching key is found or the end of file is reached. When a record having a matching key is found, the requested task identification number is compared to the identification field of the record. If there is a match, the desired record has been found. If not, then searching continues by sequential access until there is a match of the identification numbers or until the keys no longer match.

44 Claims, 5 Drawing Sheets

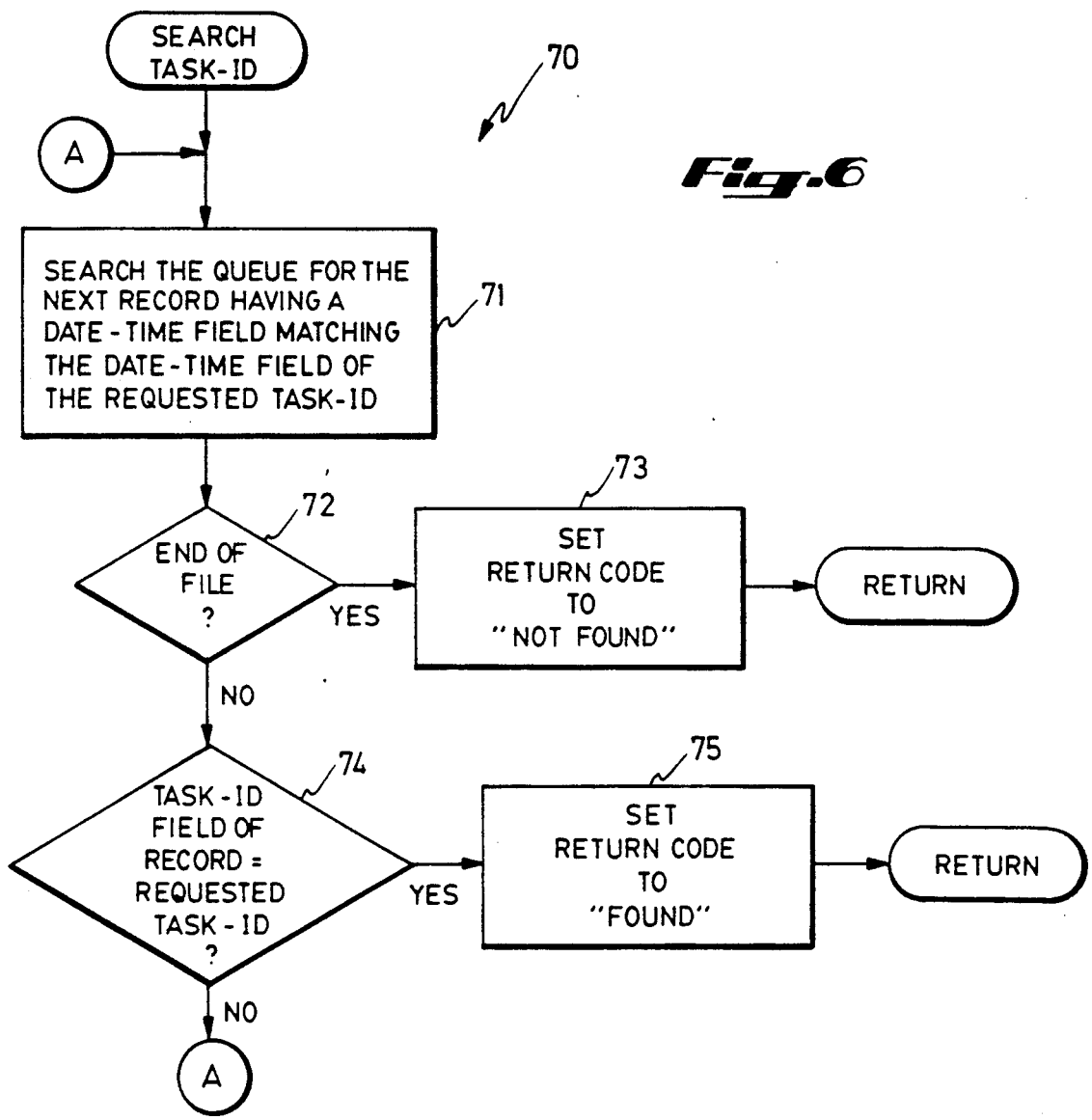

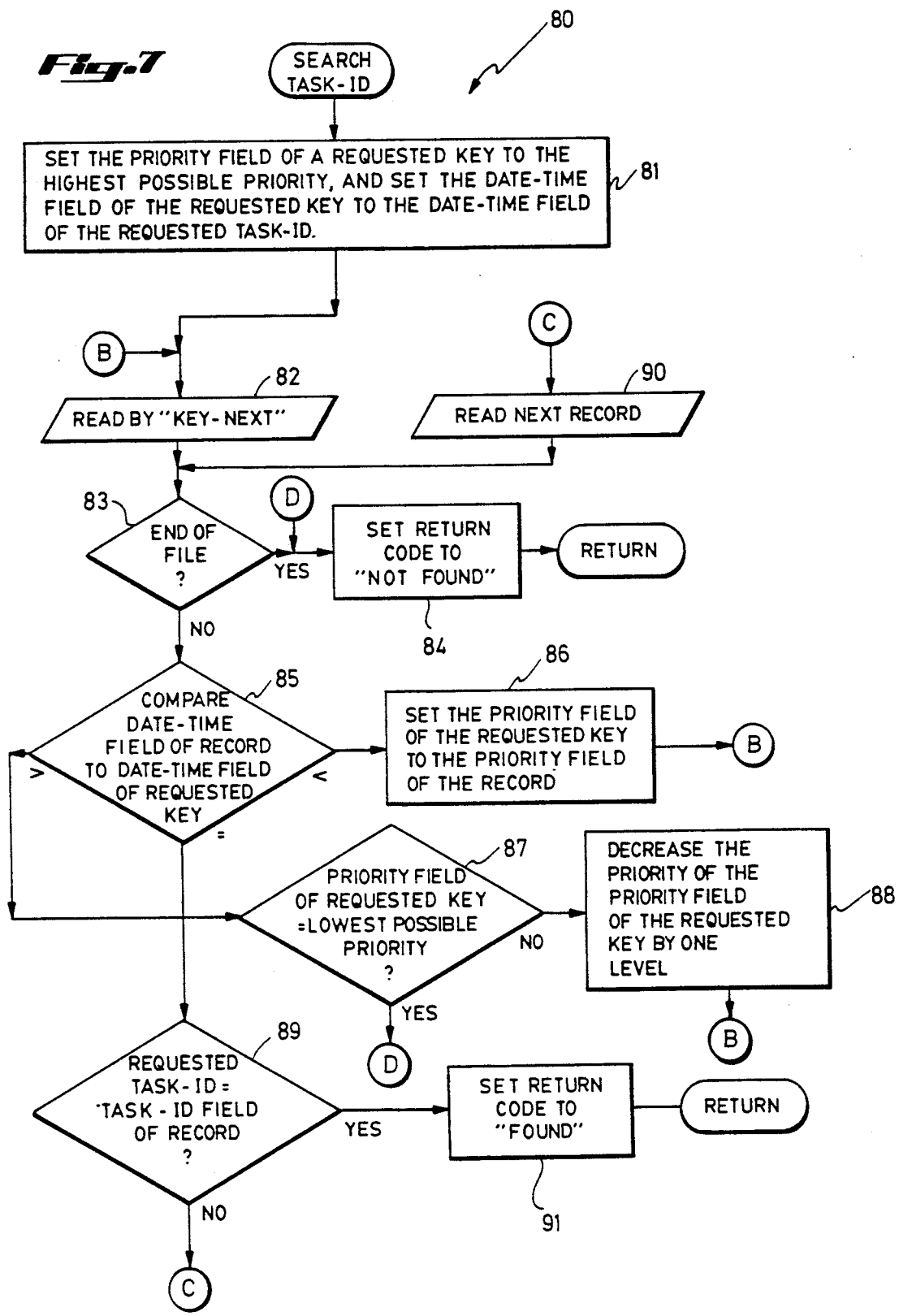

SINGLE-KEYED INDEXED FILE FOR TP QUEUE REPOSITORY

This is a continuation of copending application Ser. No. 07/220,461 filed on Jul. 18, 1988, abandoned.

BACKGROUND OF THE INVENTION

1. Technical Field

The present invention generally relates to distributed computing, and more particularly to transaction processing. Specifically, the present invention relates to a method of searching a queue holding a series of requests for data processing tasks or transactions.

2. Description of Related Art

A queue is a line of items waiting for service in a system, such as tasks to be performed by a data processor. Associated with a queue is a queuing discipline that orders the entries in the queue according to some characteristic of the entries. Typical queuing disciplines include priority order, first in first out (FIFO), and last in first out (LIFO).

Service queues for data processing tasks typically employ a hybrid of the priority order and FIFO disciplines. The tasks are assigned respective priority levels so that a higher priority request placed in the queue after a lower priority request will be serviced first. Tasks in the same priority level, however, are serviced on a FIFO basis.

For some service queues, it is desirable to leave the task at the head of the queue while the task is being serviced, and remove it from the queue only after processing of the task has completed. If the task was not processed successfully, it may be transferred to an "error queue" prior to being removed from the service queue. Typically, the service queue is kept in nonvolatile or permanent memory so that in the event of a partial system failure, there will be a record of the task being performed at the time of the failure and a record of the tasks not yet performed. The results of the interrupted task can be inspected to determine whether that task completed, whether it can be restarted from an intermediate point, or whether it must be restarted from the beginning after intermediate results have been discarded. The remaining tasks on the queue can then be performed.

A very useful data structure known as a "key indexed file" is organized as a queue to provide both random and sequential access to data records. The data records are stored in a primary index structure ordered by a "primary key" and can also be retrieved through alternative index structures ordered by alternative keys. The alternative data structures do not contain data records; instead, they contain appropriate pointers to the data records. Software facilities for managing key indexed files typically provide the option of allowing two records to have the same keys; in this case, the records are stored or indexed so that they can be retrieved in first-in, first-out order. Therefore, service queues have been implemented as key indexed files by using a priority number as the primary key.

For data processing applications, and in particular distributed computing, a unique identification number is typically assigned to each task or transaction performed by a computer system. Also in such systems queues are typically used to transfer task data from one set of processors to another set of processors. In many applications it is desirable for the processing of a task to access the task data of another task, for example, to share data among tasks, to alter the priority of task execution, or to cancel tasks that have become unnecessary. To search a service queue for a specified task, the service queue could be a key indexed file using the task priority level as a primary key and using the task identification number as an alternate key. But using two keys decreases memory access speed because of the need to update the index for the alternate key any time a task is inserted or removed from the queue.

SUMMARY OF THE INVENTION

A task queue is structured as a single-keyed indexed file in which the key has a most significant portion indicating a priority level and a less significant portion that is ordered with the loading of the tasks into the queue. For any given task record in the queue, the less significant portion of the key is determinable from a respective task identifier. Preferably the less significant portion of the key is a "time stamp" including the current date when the task was created and a representation of the data processor's internal 24 hour time clock, and a task identification number is formed by appending a node number to the time stamp in the event that the system has multiple processors capable of creating different tasks at the same time. This format of the single key causes an internal ordering of the records in the queue that is sequential with respect to the less significant portion of the key within blocks of records having the same priority. Therefore, due to the relationship between the key and the task identification number for each task record in the queue, it is possible to quickly search for the record having a requested task identification number.

Conventional memory management facilities for accessing key-indexed files can be used for searching the queue. The queue is first searched by random or "key next" access. The less significant portion of the requested key is always equal to the less significant portion determined from the desired task identification number. The priority field of the key is first set to the highest priority. The priority field of the key is changed by at least one level after each "key-next" access when the less significant portion of the requested key does not match the corresponding field of the record. Random access continues until the less significant portion of the requested key matches the corresponding field of the record. This is the desired record if the requested task identification number matches the task identification field of the record. If the requested task identification number does not match the task identification field of the record, searching continues by sequential or "next record" access. If the key changes during the sequential search, then searching continues by "key next." The search process continues until the desired record is found or the end of file is reached. This is equivalent to searching for matches of the key, and then searching the records having key matches for a matching task identification number.

BRIEF DESCRIPTION OF THE DRAWINGS

Other objects and advantages of the invention will become apparent upon reading the following detailed description and upon reference to the drawings in which:

FIG. 6 is a flowchart of a procedure for searching the task queue of FIG. 5 to find a task record having a requested task identifier; and FIG. 7 is a flowchart of a procedure for using conventional key indexed file searching facilities to search the task queue of FIG. 5 to find a task record having a requested task identifier.

Figure 1:
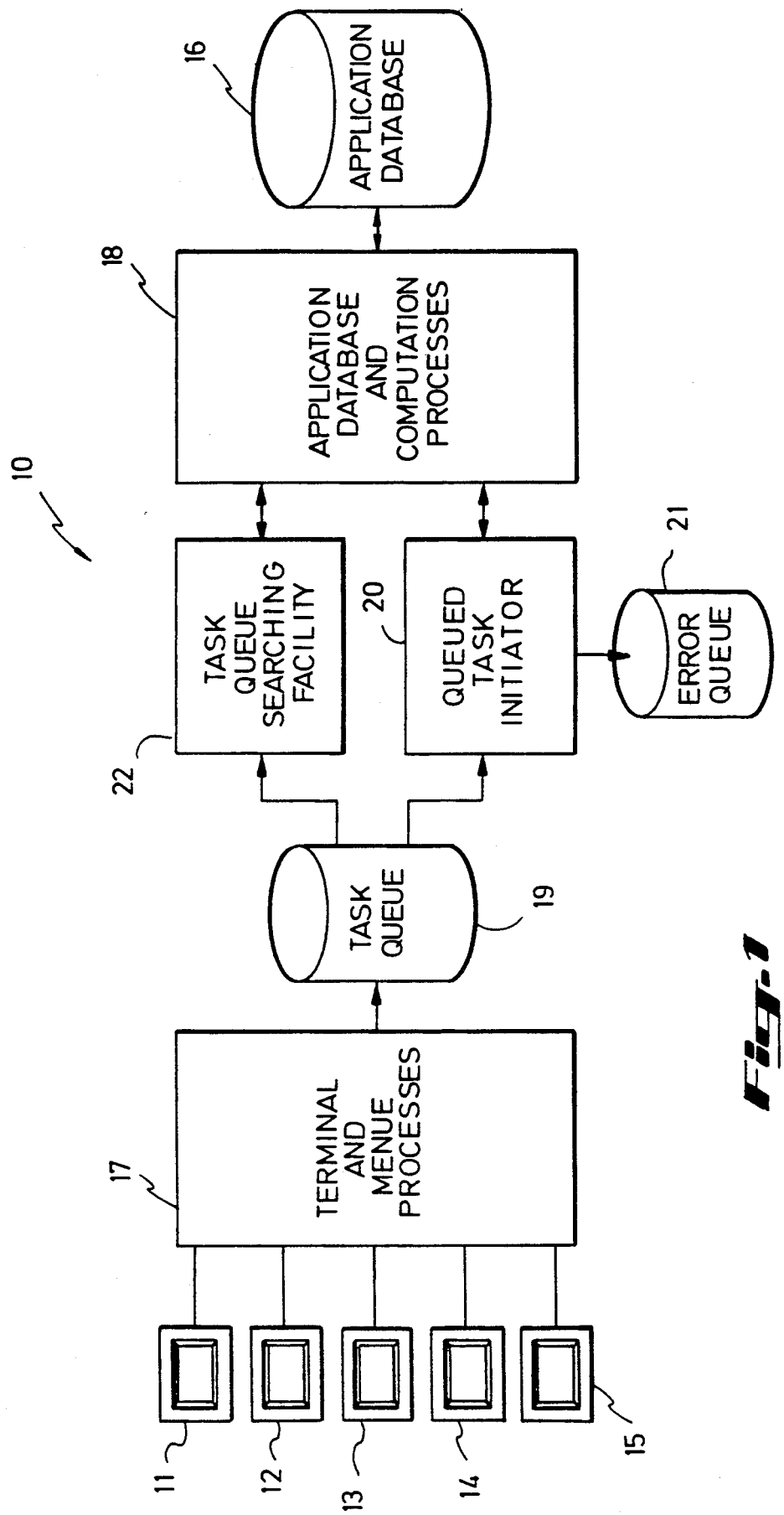
FIG. 1 is a block diagram of a transaction processing system incorporating a task queue organization and a task queue searching facility in accordance with the invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to FIG. 1, there is shown a block diagram of a transaction processing system generally designated 10 incorporating various aspects of the present invention. A transaction is a series of operations that must execute as a unit or not at all. In other words, if a partial system failure such as a "crash" occurs and the system is then restarted, the data base will not include any updates of any transactions interrupted by the crash, but it will include all of the updates of all transactions completed prior to the crash.

A transaction typically includes a set of operations necessary to change a data base from one consistent state to another consistent state. The consistent states of the data base may therefore represent the permissible states of objects that model a natural-world transaction or entity. In a financial transaction system, for example, the debiting of a first account and the crediting of a second account must both be performed to change the state of the accounts from one permissible state to another. Therefore, after a "crash" of the system, the accounts should not be found in an inconsistent state in which the first account is debited but the second account is not credited, since in this case the accounts would not balance.

To define a set of data processing operations as a transaction, they are performed by executing a respective set of program instructions in a "recovery unit" delimited by special instructions for beginning and ending the recovery unit. These instructions are recognized by a memory or data base management facility that organizes the data base and controls access to it in such a way that all updates of the data base by instructions in the recovery unit appear to be performed simultaneously. At an elementary level, this occurs because the data base is defined by switches or pointers to records or files and all of the updates can be made simultaneously by changing a switch or pointer in a single "atomic" operation. Therefore, the desired changes are first made to alternative or duplicate data base records which can all be simultaneously switched or substituted for the permanent records of the states of the objects in the system.

The computer programmer need not be concerned with the internal mechanism used to consistently update the data base because "recovery unit" facilities having a wide range of operations are well known and commercial available. A typical "recovery unit" facility, for example, is the "recovery unit journaling" feature of Records Management Services (RMS) software sold by Digital Equipment Corporation, Manard, Mass. 01754.

Even through the "recovery unit" feature of transaction processing might not be essential for a particular application, the structure and organization imposed upon an application by the transaction processing methodology may facilitate the use and maintenance of the application software as well as the application data base. By subdividing data processing operations into individual transactions, the operations and the data managed by the system remain consistent. Also, since the data processing operations are subdivided into individual units, it is possible to expand or change the configuration of the system, without changing the programing that defines the transactions.

In general, transaction processing is preferable over alternatives such as time sharing or batch processing when the system must support a moderate to large number of users at the same time, the data processing operations may be subdivided into transactions that use the same set of data files or data bases, and the data processing operations involve predefined, structured work. Transaction processing is useful, for example, in inventory systems, reservation systems, and other data base management systems.

A user typically begins a transaction in a transaction processing system by entering information into a form displayed on a terminal. For this purpose the system 10 in FIG. 1 includes five video display terminals 11 to 15. The system 10 processes the information and interacts with one or more files in an application data base 16.

The performance of a transaction processing system can be improved by executing the terminal and menu functions separate from the data base and computation functions. As shown in FIG. 1, for example, the system 10 has terminal and menu processes 17 separate from application data base and computation processes 18. The processes 17 controlling the terminal and menu functions are referred to as the "front end" of the transaction processing system, and the data base and computation processes 18 are referred to as the "back end" of the system.

The terminal and menu processes 17 and the application data base and computation processes 18 could be performed by separate data processors, or they could be performed by a single data processor having an operating system that supports a multiprocessing environment. A system 10 employing a single processor is referred to as a "single-node" system, and a system having more than one data processor is referred to as a "multiple-node" system or network. In a multiple-node system, the performance and resource sharing of the system is improved by installing the terminal and menu processes 17 on one computer or set of computers, and the application, data base and computation processes 18 on another computer or set of computers.

To improve the performance of the system 10 still further, data provided by the terminal and menu processes 17 are transmitted to the application data base and computation processes 18 through a "task queue" 19. The system performance is especially improved for transaction processing applications requiring data capture and deferred processing of data, high application availability and transaction persistence. An example of such an application is the processing of time card data that is entered into a system in a very short amount of time during a shift change. In such an application, the processing of each data item immediately could have an adverse effect on the overall performance of the system, so that it is useful to be able to capture the data and store it in the task queue 19 for future processing. This type of processing is also known as "desynchronized processing" because the data capture and the data processing are not synchronized.

The task queue 19 enhances the availability of the system when the terminal and menu processes 17 are performed by at least one processor that is separate from the processor or processors performing the application data base and computation processes 18. In such a distributed environment, if the back-end processor or processors fail, the front-end processor or processors can continue processing by submitting the tasks to the task queue 19.

When the back-end processor or processors are available for assignment to a new task, the queued task initiator 20 causes the next unassigned task in the queue 19 to be assigned and initiated. Once the assigned task is completed, it is removed from the task queue 19.

Completion of a task does not necessarily mean that the application associated with the task was successfully performed because the application data base and computation processes 18 may detect the presence of an error in the data to be processed or a failure in the system 10 that prevents the application from being performed. In either case, the queued task initiator 20 places an error code for the task in an error queue 21 before removing the task from the task queue 19. Also, depending upon the application, it may be desirable for the queued task initiator 20 to transfer some or all of the task data from the task queue to the error queue 21 when the respective application cannot be normally completed, in order to permit the task to be completed after erroneous data is corrected or after the system 10 is repaired. The error codes placed in the error queue 21, for example, are periodically reviewed by a system operator (not shown) to take appropriate corrective action.

In a typical transaction processing application, it is desirable for the processing of a task to access the data of another task, for example, to share data among tasks, to alter the priority of task execution, and to cancel tasks that have become unnecessary or will not complete. One such application is the management of the task queue 19 by a system operator or operating system to respond to abnormal system conditions such as a task that fails to complete within a reasonable amount of time or tasks that become deadlocked due to conflicting requests for access to the data base 16. For this purpose each task or transaction is assigned a unique task identification number before it is placed in the task queue.

Since it is desirable to assign different priorities to different tasks and sometimes it is desirable to change the priority of the tasks in the task queue, the ordering of the tasks in the task queue 19 may be different from the ordering of their task identification numbers. Therefore, if the task queue is organized as a single key index file to obtain the proper ordering of the tasks by priority, the task identification number cannot be used as the single key.

To search the task queue for a task having a requested task identification number, the task queue 19 could be organized as a two-key indexed file using the task identification number as the alternate key. The access time for queuing and dequeuing tasks, however, would be greatly increased by the need to access and update the index for the alternate key.

In accordance with the present invention, a single-key index file is used effectively by selecting the format for the single key and the format for the task identification number in a certain way and using a novel task queue searching facility 22 for searching the queue for a task having a requested task identification number. The task queue searching facility 22 is further described below and its operation is more easily understood in relation to the preferred organization and operation of the task queue.

Figure 2:
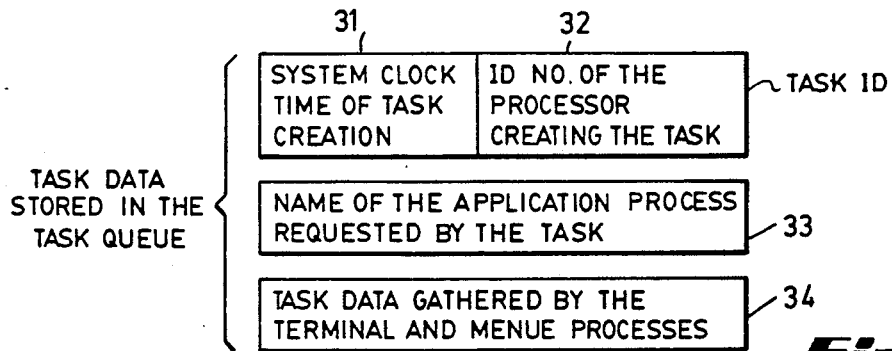
FIG. 2 is a diagram of the preferred format of a task record stored in the task queue used in the system of FIG. 1.

Turning now to FIG. 2, there is shown a preferred format for a record of task data that is stored in the task queue (19 of FIG. 1). Whenever the terminal and menu processes 17 have gathered data for a transaction to be performed by the application data base and computation processes (18 in FIG. 1), the terminal and menu processes create a "TASK_ID" for the requested transaction or task to be placed in the task queue 19. To uniquely identify the individual tasks, the TASK_ID is unique across time and space. In other words, any two tasks generated by the terminal and menu processes 17 at different times will necessarily have different respective tasks identification numbers, and also even if different processes create respective tasks at exactly the same time (for example, because they are created in different processors of a multiprocessor system) the task identification numbers will still be different.

As shown in FIG. 2, the uniqueness of the task identification number over time and space is guaranteed by forming the task identification number from the concatenation of the time of task creation 31 as signaled by a clock in the system, and an identification number 32 of the processor or node that created the task. The time of task creation includes the current day, month and year, so that the time of task creation will be unique for any conceivable future use of the application data base.

The task data stored in the task queue for each task further include the name 33 of a respective application process requested by the task. When such a name is recognized by the application data base and computation processes 18, a prestored routine or application program is executed to perform the transaction requested by the task.

The task data stored in the task queue 19 for each task may further include task data 34 having been gathered by the terminal and menu processes for performance of the transaction requested by the task. When the application data base and computation processes 18 perform the transaction requested by the task, the respective task data gathered by the terminal and menu processes is used as input data possibly in conjunction with other input data read from the application data base 16.

It is assumed that despite a partial system failure affecting the terminal and menu processes 17, the task queue 19 will receive task data in the format of FIG. 2. In other words, it is assumed that the task queue 19 is organized as a file in permanent memory permitting all of the task data for any given task to be written into the task queue in one "atomic" operation. This can be done, for example, by using the "recovery unit journaling" feature of any number of conventional data base management programs, such as the RMS system sold by Digital Equipment Corporation, Maynard, Mass. 01754. In this case the program instructions for writing the task data into the task queue 19 are included in one "recovery unit."

Figure 3:
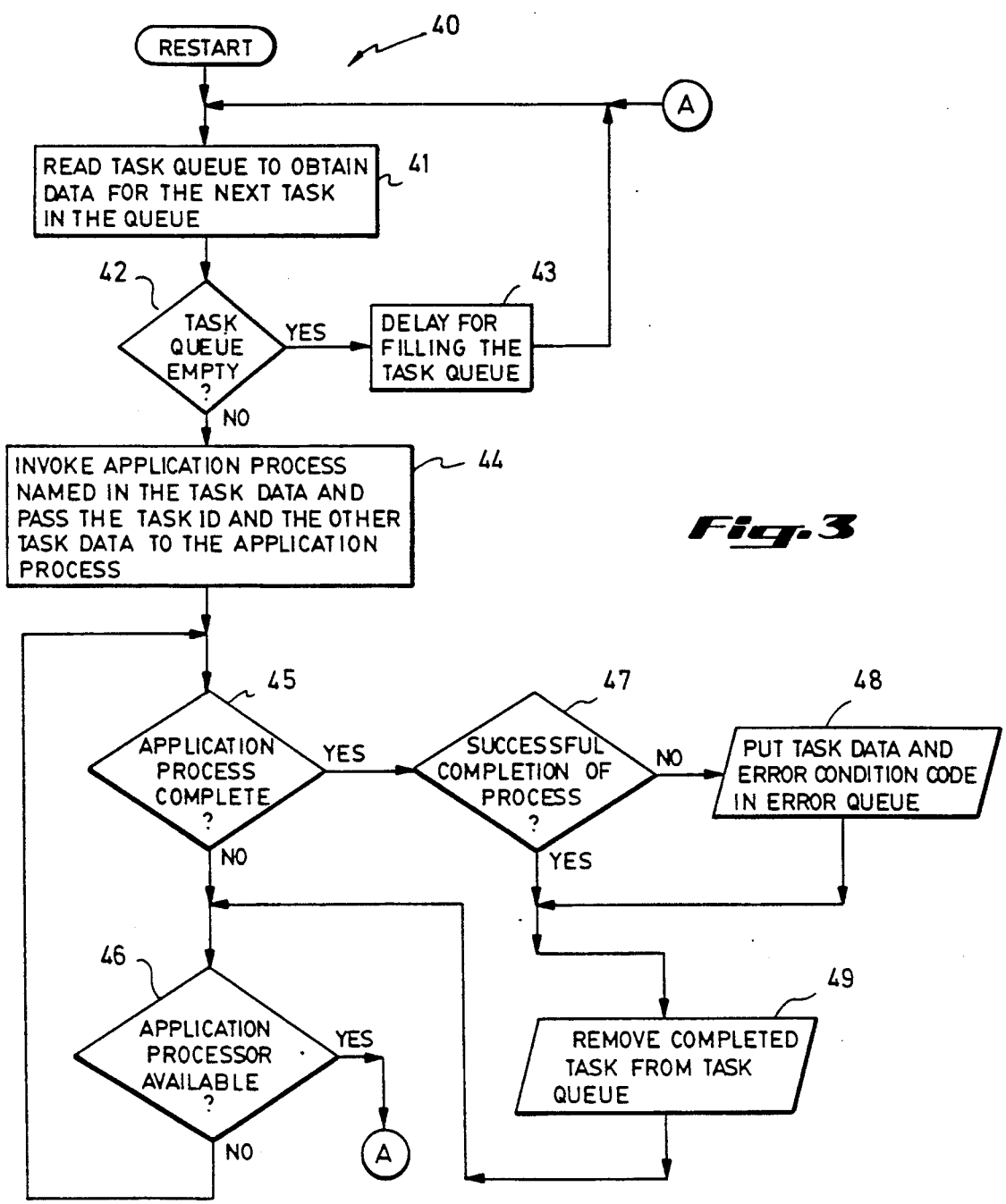
FIG. 3 is a flowchart illustrating the operation of a queued task initiator that services the task queue of FIG. 1.

Turning now to FIG. 3 there is shown a flowchart generally designated 40 of the procedure performed by the queued task initiator (20 in FIG. 1). In a first step 41, the queued task initiator reads the task queue 19 to obtain data for the next task in the queue. (In a system having a single application processor, the data appears at the head of the queue). As tested in step 42, the task queue could be empty. In this case, in step 43, the queued task initiator delays for a certain amount of time to permit the task queue to be filled by the terminal and menu processes (17 in FIG. 1) before the queued task initiator again reads the task queue.

When task data is obtained from the queue, the queued task initiator performs a step 44 which invokes the application process named in the task data (33 in FIG. 2) and passes the task identification number and the other task data (34 in FIG. 2) to the application process. In step 45, the queued task initiator checks whether an application process is complete. If not, in step 46 the queued task initiator checks whether an application processor is available. If an application processor is not available, step 45 is performed again; otherwise, data for the next task in the task queue can be read in step 41. (Step 46 need not be performed in a single processor system, since in a single-processor system, the sole application processor will not be available until its current process is complete). When the invoked application process is complete, the queued task initiator 20 determines in step 47 whether the process has successfully completed. If not, then in step 48 the task identification number and an error condition code for the process having unsuccessfully completed is placed in the error queue 21. Finally, in step 49, the completed task is removed from the task queue, and the task initiation cycle is repeated beginning in step 46.

In a system 10 in which a single computer or processor performs all of the application data base and computation processes (18 in FIG. 1), step 44 need merely be a subroutine call which passes execution to the invoked application process until the invoked application process has been completed. In a multiple processor system in which a number of computers or processors simultaneously perform different application processes it is necessary for the system to insure that a conflict does not occur between the application processes that are occurring simultaneously.

A potential conflict known as "deadlock" may occur, for example, when each processor in a pair of processors needs a resource that is currently being used by the other processor. In this case, the deadlock must be resolved before either of the processors can complete their assigned application. Another source of potential conflict arises when the net result of two simultaneously performed applications is dependent upon whether a particular step in one application is performed before or after a particular step in another application. In such a case, it is desirable for the system to provide a consistent result that is dependent only upon the order in which the tasks appear in the task queue 19.

Although there are a number of ways of dealing with these conflicts, a particularly simple way is to inhibit the queued task initiator 20 from reading the next task in the queue and dispatching it to the next available application processor until the previously invoked task has seized control or "opened" all of the files that it might need. In other words, step 44 should not be completed until the invoked process has opened all of the files that it might need.

Figure 4:
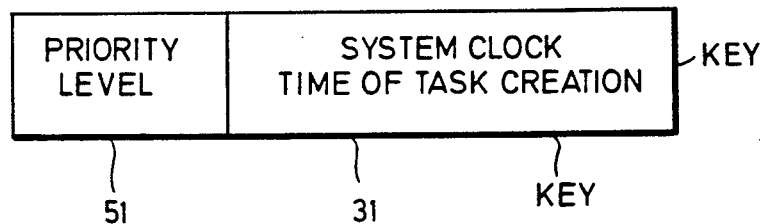
FIG. 4 is a diagram of the preferred format of a task identification number.

Turning now to FIG. 4, there is shown the preferred format for the key. The key includes a priority level 51 and the same time of task creation 31 that, as previously shown in FIG. 2, makes up the most significant portion of the task identification number. Due to the relationship between the key of FIG. 4 and the task identification number of FIG. 2, it is possible for them to overlap in the data records of a single keyed access file making up the task queue (19 in FIG. 1).

Figure 5:
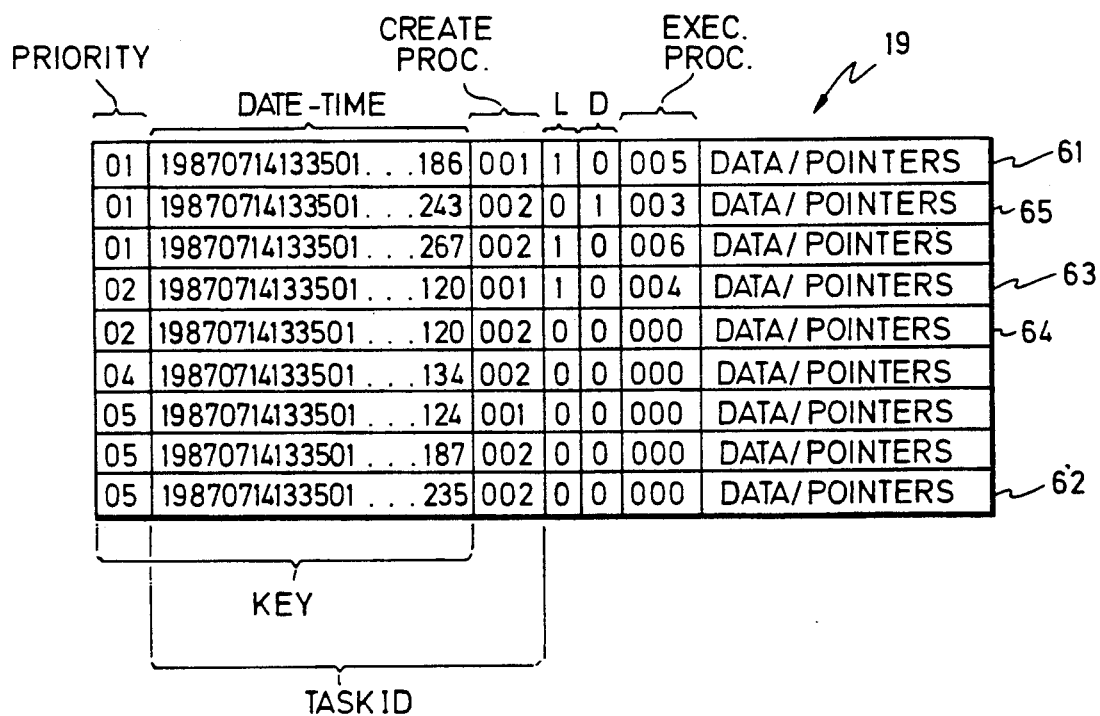
FIG. 5 is a diagram showing the preferred single-key indexed file organization of the task queue.

Turning now to FIG. 5, there is shown one possible format for the task queue 19. The queue is an ordered set of records including, for example, a record 61 at the head of the queue, a record 62 at the tail of the queue, and a number of intermediate records. For the sake of illustration, the records are shown as being consecutive in a table, although the records need not be located consecutively in permanent memory. Due to the fact that a record being inserted into the queue may have a higher priority than a record already existing in the queue, it is not efficient for the sequence of the data records in the queue to be the same as the sequence of the data records in memory address space. As is well known, a fragmented data structure such as a "doubly linked list" is more efficient for implementing a queue. The implementation of a queue as a doubly linked list is well known and is further described, for example, in Levy & Eckhouse, Jr., *Computer Programing And Architecture The VAX*-11, Digital Equipment Corporation, 1980, pp. 178-188.

As further illustrated in FIG. 5, each record includes a priority field, a date-time field, a "CREATE PROC." field, a memory lock bit L, a delete flay D, an "EXEC. PROC." field, and other fields of data or pointers to data.

The task records 61–62 are inserted into the queue 19 by descending order of priority value, and if the priority is the same, then by descending order of the value of the date-time field. Therefore, higher priority levels have lower numerical values, and earlier date-times have lower numerical values. The numerical values of the TASK_ID field uniquely identifies each task record, but the numerical value in the KEY field of the record does not. This is seen by a comparison of records 63 and 64 which represent tasks having the same priority and being created at the same time but being created by different processors.

The entry 61 at the head of the queue has the lowest priority value of 1, and a date-time field indicating that it was created on the 14th of July 1987 at 1:35 p.m. The least significant position of the date-time field, for example, further identifies the precise clock cycle of the system. The CREATE PROC. field has a numerical value of 1 indicating that the task represented by the first record 61 was created by processor number 1 in the system. The lock flag L indicates that this task is currently being performed and only the executing processor identified in the EXEC. PROC. field is permitted to access the task record 61 at the current time. The value of zero for the delete flag D further indicates that the executing processor has not completed its task. The record 65, for example, has a lock flag L having a value of 0, a delete flag D having a value of 1, and an EXEC. PROC. field having a value of 5, indicating that processor No. 5 completed processing of the task for that record and the record may be deleted from the queue.

An internal organization similar to that shown in FIG. 5 would occur if the records were inserted into and deleted from the queue 19 by conventional memory management facilities for accessing key indexed files, such as the RMS facility described above. In particular, the order of the records in the queue is dependent upon the numerical values of their respective key fields and any two records having the same key field, such as records 63 and 64, are inserted into and deleted from the queue on a FIFO basis.

Conventional facilities such as the RMS facility provides for record locking and deleting which manage the lock and delete flags and keep track of the processor or application given the sole priority to access a record. Therefore, entries can be inserted into the queue and deleted from the queue by executing respective high level language instructions which invoke the facility for managing key indexed files. A facility such as RMS, for example, skips over the locked records when obtaining the next record in the queue. These standard functions for accessing key indexed records, for example, include a READ_BY_KEY_NEXT service that reads the indexed file by key and returns either the first record that matches a requested key, or if a record does not exist which has a key field matching the requested key, then the next record in the file following where the matching record would have been. In other words, the READ_BY_KEY_NEXT performs a random access to the file based on an attempted match between a requested key and values in the key field of the records. Conventional facilities for managing key indexed files also provide a service such as READ_NEXT which reads the indexed file and returns the next record following the record which was most recently returned by either the READ_BY_KEY_NEXT or the READ_NEXT service. In other words, the READ_NEXT service provides sequential access to the key indexed file.

Due to the relationship between the key and the task identification number, it is possible to very quickly search the queue for a record having a requested task identification number by employing the procedure illustrated by the flowchart generally designated 70 in FIG. 6. In the first step 71, the queue is searched beginning at the head of the queue for the next record having a date-time field matching the date-time field of the requested task identification number. If an end of file is reached during this search, as detected in step 72, then in step 73 the return code is set to "NOT FOUND" and the search is completed without success. If an end of file is not detected in step 72, then a record has been found which possibly has a matching task identification number. A precise match is checked for in step 74 by determining whether the task identification field of the record precisely matches the requested task identification number. In the specific format shown in FIG. 5, step 74 could be performed merely by checking whether the CREATE PROC. field of the record matches the processor ID number found in the least significant portion of the requested task identification number. If there is a match, then in step 75 the return code is set to "FOUND" and the search has completed successfully. If a match is not detected in step 74, then execution loops back to step 71 to continue searching the queue.

Due to the fact that the queue is organized as an indexed filed in which the key is arranged in an ascending or descending order, the step 71 of searching the queue can be performed very efficiently by searching with the key. Also, existing facilities for managing key indexed files already provide optimized procedures for performing this search. In accordance with an important feature of the present invention, the searching of the queue is performed by using both the random access and sequential access services provided by the memory management facilities. The procedure for doing this is illustrated by the following program listing:

```
100    KEY_REQ.PRIORITY_FIELD ← "HIGHEST
       POSSIBLE PRIORITY"
110    KEY_REQ.DATE_TIME_FIELD ← TASK_
       ID_REQ.DATE_TIME_FIELD
120    READ_BY_KEY_NEXT
130    LOOP
140        IF END_OF_FILE
150        THEN
160            EXIT_LOOP AND RETURN
               ( "NOT FOUND" )
170        ENDIF
180        IF RECORD.DATE_TIME_FIELD < KEY_
           REQ.DATE_TIME_FIELD
190        THEN
200            KEY_REQ.PRIORITY_FIELD ←
               RECORD.PRIORITY_FIELD
210            READ_BY_KEY_NEXT
220        ELSE
230            IF RECORD.DATE_TIME_FIELD >
               KEY_REQ.DATE_TIME_FIELD
240            THEN
250                IF KEY_REQ.PRIORITY_FIELD =
                   "LOWEST POSSIBLE PRIORITY"
260                THEN
270                    EXIT_LOOP AND RETURN
                       ( "NOT FOUND" )
280                ELSE
290                    INCREMENT KEY_REQ.
                       PRIORITY_FIELD
300                    READ_BY_KEY_NEXT
310                ENDIF
320            ELSE
330                IF RECORD.TASK_ID_FIELD =
                   TASK_ID_REQ
340                THEN
350                    EXIT_LOOP AND RETURN
                       ( "FOUND" )
360                ELSE
370                    READ_NEXT
380                ENDIF
390            ENDIF
400        ENDIF
410    END_LOOP
```

The operation of this program listing should become apparent from the corresponding flowchart generally designated 80 in FIG. 7. In general terms this procedure begins by assuming the highest possible priority for the key. The date-time field for the requested key is always the date-time field of the requested task identification number. The queue is then read in random access fashion using the requested key. If a record having a matching key is not found then the key priority is lowered based on the priority field of the record that was returned, and then the file is re-read. This last operation occurs repeatedly stepping down through the possible priority levels until a record having a matching key is found or until the end of the file is reached. When a record having a matching key is found, the requested task identification number is compared to the identification number field of the record. If there is a match, the desired record has been found. If there is not a match, searching continues by sequential access until there is a match of the identification numbers or until the keys no longer match.

In the first step 81 of the flowchart 80, the priority field of the requested key is set to the highest possible priority, and the date-time field of the requested key is set to the date-time field of the requested "TASK_ID". Next in step 82 the queue is first read by the "KEY_NEXT" service. If an end of file is detected in step 83, then in step 84 a return code is set to "NOT FOUND" and the search is completed without success.

If an end of file is not detected in step 83, then in step 85 the date-time field of the record read from the file is compared to the date-time field of the requested key. If the date-time field of the record is smaller, then random access can continue with the priority field of the requested key being set to the priority field of the record, as performed in step 86. In other words, a matching date-time field may still exist for a record having the same priority as the record having been read in step 82. But if the date-time field of the record is greater than the date-time field of the requested key, then it is not possible to find a matching recording having the same priority as the priority field of the key. Therefore, if in step 87 the priority field of the requested key is equal to the lowest possible priority, then a match will not be found in the file, and in step 84 the return code is set to "NOT FOUND" and the search completes without success. Otherwise, if it is found in step 87 that the priority field of the requested key is not equal to the lowest possible priority, then in step 88 the priority of the priority field of the requested key is increased by one level and random access searching continues in step 82.

If in step 85 the date-time field of the record is found to match the date-time field of the requested key then there is a possibility that the requested task identification number matches the task identification field of the record. This is tested in step 89. If a match does not occur, then execution jumps to step 90 to access the queue sequentially by reading the next record, and then execution continues in step 83. If a match was found in step 89, then the desired record has been found and therefore the return code is set to "FOUND" in step 91 and the search is completed with success.

In view of the above, there has been disclosed a task queue configured as a single-keyed index file in which the key and the task identification number are related in such a way that conventional services for random access of single-keyed indexed files can be used to efficiently find a task record having a requested task identification number. Therefore it is unnecessary to use the task identification number as an alternate key, which would slow down the queuing and dequeuing operations. Although the task queue is especially suited for queuing requests for transaction processing, the task queue and searching method of the invention are especially advantageous for any queuing application where it is desirable to identify each task and also change the priority of a task after the assignment of an identification number.

I claim:

1. A memory device in a data processing system, said memory device holding a queue of data, said queue comprising an ordered set of a multiplicity of records of said data, each of said records including an identifier field holding a respective identifier different from the respective identifiers in the identifier fields of the other ones of said records, each of said records also including a key field holding a respective key value having a most significant portion indicating a priority level and a less significant portion that is a predetermined function of the respective identifier in the record, said records having been stored in said queue sequentially with respect to said less significant portion of the key values, and said records being ordered in said queue sequentially with respect to said key values but not sequentially with respect to said less significant portion of the key values, whereby records having the same priority level are included in respective blocks of said records, and the records in each block are ordered sequentially with respect to the less significant portion of the key values.

2. The memory device as claimed in claim 1, wherein said identifier field in each record includes a subfield holding the less significant portion of the respective key value.

3. The memory device as claimed in claim 1, wherein said identifier held in the identifier field of each record indicates a respective time value.

4. The memory device as claimed in claim 3, wherein said time value includes a date, and a time in a twenty-four hour format.

5. The memory device as claimed in claim 3, wherein said identifier further includes an identification number indicating a processor in said data processing system.

6. The memory device as claimed in claim 1, wherein said records include different records having the same key value in their respective key fields.

7. The memory device as claimed in claim 1, wherein said queue is a key-indexed file having a primary key, and said key values are values of said primary key.

8. A memory device for a data processing system, said memory device holding a queue of data, said queue comprising an ordered set of a multiplicity of records of said data in a key-indexed file having a primary key, each of said records including an identifier field holding a respective identifier different from the respective identifiers in the identifier fields of the other ones of said records, each of said records also including a key field holding a respective key value which is a value of said primary key for said key-indexed file, said key value having a most significant portion indicating a priority level and a less significant portion, the key field and the identifier field of each of said records overlapping over a common field holding the less significant portion of the key value in the key field, said records having been stored in said queue sequentially with respect to said less significant portion of the key values, and said records being ordered in said queue sequentially with respect to said key values but not sequentially with respect to said less significant portion of the key values, whereby records having the same priority level are included in respective blocks of said records, and the records in each block are ordered sequentially with respect to the less significant portion of the key values.

9. The memory device as claimed in claim 8, wherein the less significant portion of the key value in the key field of each of said records indicates a respective time value.

10. The memory device as claimed in claim 8, wherein the identifier held in the identifier field of each record includes an identification number identifying a processor in said data processing system.

11. A data processing system comprising, in combination, a memory device; and means for sequentially storing a multiplicity of data records in said memory device to form a queue of said records wherein each of said records includes an identifier field holding a respective identifier different from the respective identifiers in the identifier fields of the other ones of said records, each of said records also includes a key field holding a respective key value having a most significant portion indicating a priority level and a less significant portion that is a predetermined function of the respective identifier in the record, said records are stored in said queue sequentially with respect to said less significant portion, and said records are ordered in said queue sequentially with respect to said key values but not sequentially with respect to said less significant portion of the key values, whereby records having the same priority level are included in respective blocks of said records, and the records in each block are ordered sequentially with respect to the less significant portion of the key values.

12. The data processing system as claimed in claim 11, wherein said identifier field in each record includes a subfield holding the less significant portion of the respective key value.

13. The data processing system as claimed in claim 11, wherein said identifier held in the identifier field of each record indicates a respective time value.

14. The data processing system as claimed in claim 13, wherein said time value includes a date, and a time in a twenty-four hour format.

15. The data processing system as claimed in claim 13, wherein said identifier further includes an identification number indicating a processor in said data processing system.

16. The data processing system as claimed in claim 11, wherein said records include different records having the same key value in their respective key fields.

17. The data processing system as claimed in claim 11, wherein said queue is a key-indexed file having a primary key, and said key values are values of said primary key.

18. A data processing system comprising, in combination, a memory device; and means for sequentially storing a multiplicity of data records in said memory device to form a queue of said records in a key-indexed file wherein said key-indexed file has a primary key, each of said records includes an identifier field holding a respective identifier different from the respective identifiers in the identifier fields of the other ones of said records, each of said records also includes a key field holding a respective key value which is a value of said primary key for said key-indexed file, said key value has a most significant portion indicating a priority level and a less significant portion, the key field and the identifier field of each of said records overlap over a common field holding the less significant portion of the key value in the key field, said records are stored in said queue sequentially with respect to said less significant portion, and said records are ordered in said queue sequentially with respect to said key values but not sequentially with respect to said less significant portion of the key values, whereby records having the same priority level are included in respective blocks of said records, and the records in each block are ordered sequentially with respect to the less significant portion of the key values.

19. The data processing system as claimed in claim 18, wherein the less significant portion of the key value in the key field of each of said records indicates a respective time value.

20. The data processing system as claimed in claim 18, wherein the identifier held in the identifier field of each record includes an identification number identifying a processor in said data processing system.

21. A data processing system comprising a memory device, means for producing data records and means for sequentially storing said records in said memory device to arrange said records in said memory device in an ordered set forming a queue of said records, said means for producing data records including means for generating identifiers for identifier fields in said records so that each of said records includes an identifier field holding a respective identifier different from the respective identifiers in the identifier fields of the other ones of said records, said means for producing data records further including means for producing key values for key fields in said records so that each of said records also includes a key field holding a respective key value having a respective most significant portion indicating a priority level and a less significant portion that is a predetermined function of the respective identifier in the record, and said means for sequentially storing said records including means for ordering said records in said queue so that records having the same priority level are included in respective blocks of said records, the records in each block are ordered sequentially with respect to the less significant portion of the key values and sequentially with respect to the storing of said records in said memory, and the records in said queue are ordered sequentially with respect to the key values but not sequentially with respect to the storing of said records in said memory device.

22. The memory device as claimed in claim 21, wherein said identifier field in each record includes a subfield holding the less significant portion of the respective key value.

23. The memory device as claimed in claim 21, wherein said identifier held in the identifier field of each record indicates a respective time value.

24. The memory device as claimed in claim 23, wherein said time value includes a date, and a time in a twenty-four hour format.

25. The memory device as claimed in claim 23, wherein said identifier further includes an identification number indicating a processor in said data processing system.

26. The memory device as claimed in claim 21, wherein said records include different records having the same key value in their respective key fields.

27. The memory device as claimed in claim 21, wherein said queue is a key-indexed file having a primary key, and said key values are values of said primary key.

28. A data processing system comprising a memory device, means for producing data records and means for sequentially storing said records in said memory device to form a queue of said records in a key-indexed file wherein said key-indexed file has a primary key, said means for producing data records including means for generating time values and processor numbers and combining the time values and processor numbers to form identifiers for identifier fields in said records so that each of said records includes an identifier field holding a respective identifier different from the respective identifiers in the identifier fields of the other ones of said records, said means for producing data records further including means for producing key values for key fields in said records so that each of said records also includes a key field holding a respective key value having a most significant portion indicating a priority level and a less significant portion that is the time value of the respective identifier in the record, and said means for sequentially storing said records including means for ordering said records in said queue so that said key values are values of said primary key of said key-indexed file and records having the same priority level are included in respective blocks of said records, the records in each block are ordered sequentially with respect to the less significant portion of the key values and sequentially with respect to the storing of said data records in said memory, and the records in said queue are ordered sequentially with respect to the key values but not sequentially with respect to the storing of said records in said memory device.

29. The data processing system as claimed in claim 28, wherein the key field and the identifier field of each record overlap over a common field holding the time value of the respective identifier value in the record.

30. A method of operating a data processor in a data processing system to search a queue for a data record having a requested identifier, said queue being held in a memory device in said data processing system, said queue comprising an ordered set of a multiplicity of records of data stored in said memory device, each of said records of data stored in said memory device, each of said records including an identifier field holding a respective identifier, each of said records also including a key field holding a respective key value having a most significant portion indicating a priority level and a less significant portion that is a predetermined function of the respective identifier in the record, said records being ordered in said queue sequentially with respect to said key values but not sequentially with respect to said less significant portion of the key values whereby records having the same priority level are included in respective blocks of said records, and the records in each block are ordered sequentially with respect to the less significant portion of the key values, said method comprising the steps of:
  a) searching said queue for records having in their respective key fields a less significant portion that is said predetermined function of said requested identifier; and
  b) determining whether the identifiers in the respective identifier fields of the records found by said searching in step (a) are the same as the requested identifier.

31. The method as claimed in claim 30, wherein said step (a) of searching includes forming a requested key having a less significant portion that is said predetermined function of said requested identifier, and randomly accessing said queue in response to said requested key to obtain a next record from said queue.

32. The method as claimed in claim 31, wherein said random accessing is performed by a software service that returns either a first record in said queue having a key value matching the requested key, or when said queue does not have a record which has a key value matching the requested key then a record in the queue next to where a record having a matching key value would have been.

33. The method as claimed in claim 32, wherein said step a) of searching includes comparing the less significant portion of said requested key to the less significant portion of the key value in the key field of said next record to determine whether said next record is one of said records having in their respective key fields a less significant portion that is said predetermined function of said requested identifier.

34. The method as claimed in claim 33, wherein said step a) of searching further includes the step of changing the most significant portion of the requested key by one level of priority and again randomly accessing said queue in response to said requested key when said comparing indicates that (1) the less significant portion of said requested key does not match the less significant portion of the key value in the key field of said next record and (2) said next record should have a most significant portion of its key value in its key field that is the same as the most significant portion of the requested key prior to said changing of the requested key.

35. The method as claimed in claim 33, wherein said step a) of searching further includes the step of changing the requested key by setting the most significant portion of the requested key to the most significant portion of the key value in the key field of said next record when said comparing indicates that (1) the less significant portion of said requested key does not match the less significant portion of the key value in the key field of said next record and (2) said next record should have a most significant portion of tis key value in its key field that is different from the most significant portion of the requested key prior to said changing of the requested key.

36. The method as claimed in claim 30, wherein said step a) of searching is initially performed by random access of said queue in response to a requested key having a portion including a less significant portion that is said predetermined function of said requested identifier, and also by sequential access of said queue to obtain sequentially a next record in said queue when said step b) of determining determines that the requested identifier is different from the identifier in the identifier field of the record having the matching key.

37. The method as claimed in claim 36, wherein said step a) of searching further comprises comparing the less significant portion of the key value in the key field of said next record in said queue to the less significant portion that is said predefined function of said requested identifier, and when said comparing indicates that (1) the less significant portion of the key value in the key field of said next record is different from the less significant portion that is said predetermined function of said requested identifier and (2) said next record should have a most significant portion of its key value in its key field that is the same as the most significant portion of the requested key, then changing the most significant portion of the requested key by one level of priority and again randomly accessing said queue in response to said requested key.

38. The method as claimed in claim 36, wherein said step a) of searching further comprises comparing the less significant portion of the key value in the key field of said next record in said queue to the less significant portion that is said predefined function of said requested identifier, and when said comparing indicates that (1) the less significant portion of the key value in the key field of said next record is different from the less significant portion that is said predetermined function of said requested identifier and (2) said next record should have a most significant portion of its key value in its key field that is different from the most significant portion of the requested key, then changing the most significant portion of the requested key by setting the most significant portion of the requested key to the most significant portion of the key value in the key field of said next record.

39. A method of operating a data processor in a data processing system to search a queue for a data record having a requested identifier, said queue being held in a memory device in said data processing system, said queue comprising an ordered set of a multiplicity of records of data stored in a key-indexed file in said memory device, each of said records including a respective identifier field holding an identifier different from the respective identifiers included in the other ones of the records, each of the identifiers having a respective time value, each of said records also including a key field holding a respective key value having a most significant portion indicating a priority level and a less significant portion that is the time value of the respective identifier in the record, said key values being values of said primary key, said records being ordered in said queue sequentially with respect to said key values but not sequentially with respect to said less significant portion of the key values, whereby records having the same priority level are included in respective blocks of said records, and the records in each block are ordered sequentially with respect to the less significant portion of the key values, said method comprising the steps of:
 a) forming search keys each having a less significant portion that is the time value of said requested identifier;
 b) randomly accessing said key-indexed file with said search keys to search said queue for records having in their respective key fields a less significant portion that is the time value of said requested identifier;
 c) determining whether the identifiers in the respective identifier fields of the records found by the searching in the step (b) are the same as the requested identifier;
 d) sequentially accessing said key-indexed file to search for additional records when said step (c) determines that a record found in step (b) does not have an identifier that is the same as the requested identifier; and
 e) determining whether the identifiers in the respective identifier fields of the additional records found by the searching in step (d) are the same as the requested identifier.

40. A data processing system comprising, in combination,
 a nonvolatile memory device holding a task queue, said queue comprising an ordered set of a multiplicity of records of task data held in said memory device, each of said records including an identifier field holding a respective identifier different from the respective identifiers in the identifier fields of the other of said records, each of said records also including a key field holding a respective key value having a respective most significant portion indicating a priority level and a less significant portion that is a predetermined function of the respective identifier in the record, said records being ordered in said queue sequentially with respect to said key values but not sequentially with respect to said less significant portion of the key values, whereby records having the same priority level are included in respective blocks of said records, and the records in each block are ordered sequentially with respect to the less significant portion of the key values;
 application processor means for performing data processing tasks using said task data;
 queued task initiator means for accessing said queue for task data for an uninitiated task that is next in the queue, and initiating that task by invoking said application processor means; and
 task queue searching means for searching said task queue for a record having a requested identifier in its identifier field, said task queue searching means including means for finding records in said task queue having in their key fields a less significant portion that is said predetermined function of said requested identifier, and means for determining whether a record found by said means for finding has an identifier in its identifier field that is the same as the requested identifier.

41. The data processing system as claimed in claim 40, wherein said identifier field in each record includes a subfield holding the less significant portion of the respective key value.

42. The data processing system as claimed in claim 40, wherein said identifier includes a date, and a time in twenty-four hour format.

43. The data processing system as claimed in claim 40, wherein said means for finding records includes means for forming a requested key having a most significant portion and a less significant portion that is said predetermined function of the requested identifier, means for randomly accessing said queue in response to said requested key to find a next record in the queue, and means for sequentially accessing said queue to find a next record in said queue when said means for determining determines that a next record found by said means for randomly accessing has an identifier in its identifier field that is different from the requested identifier.

44. The data processing system as claimed in claim 43, wherein said means for finding records further includes means for comparing the less significant portion of the key value of each next record found in the queue with said predetermined function of the requested identifier, and in response to said comparing indicating that the less significant portion of the key value of said each next record is different from said predetermined function of the requested identifier, either setting the most significant portion of the requested key to the most significant portion of the key value of said each record, or changing the most significant portion of the requested key.

* * * * *